Feb. 4, 1958 D. A. HUELSKAMP 2,821,750
NOZZLE LOCATING DEVICE
Filed Nov. 24, 1954

INVENTOR.
DONALD A. HUELSKAMP
BY Woodling & Krost
Attys.

United States Patent Office 2,821,750
Patented Feb. 4, 1958

2,821,750

NOZZLE LOCATING DEVICE

Donald A. Huelskamp, Mount Gilead, Ohio, assignor, by mesne assignments, to Koehring Company, Milwaukee, Wis., a corporation of Wisconsin Application November 24, 1954, Serial No. 470,848

5 Claims. (Cl. 18—30)

The invention relates in general to injection molding machines and more particularly to a device and the method for locating means to receive a sprue bushing in relation to an injection nozzle in such machines.

In the past, it has been extremely difficult and sometimes impossible to align the injection chamber and the injection nozzle of an injection molding machine on the true center line of the opening in the stationary die head through which the injection nozzle projects. As a result, since the central depressed surface or nozzle engaging surface on a sprue bushing which has been previously manufactured to be in a certain predetermined position will not exactly fit the injection nozzle when the sprue bushing is received within the opening. The sprue bushing is sometimes referred to as a mold part. The failure of the injection nozzle to be on the exact center line of the opening is due to the many tolerances which arise in the manufacture of this type of press and also to the means of attaching the heating chamber, which holds the injection nozzle, to the press. The heating chamber is generally attached to the injection cylinder or the material hopper assembly of the press which is primarily a separate unit from the die head of the press. This injection unit is usually located in the die head with no adjustable means of locating on the true center line. All present adjustable means for centering the injection unit on the center line of this opening in the press are quite costly and very impracticable.

Accordingly, an object of this invention is to provide injection molding machines having improved means for overcoming the adverse effect of misalignment between the injection nozzle and the die head, and for insuring accurate positioning of the nozzle with respect to a mold part such as a sprue bushing.

Other objects and a fuller understanding of this invention may be had by referring to the following description and claims, taken in conjunction with the accompanying drawings, in which:

Figure 1:
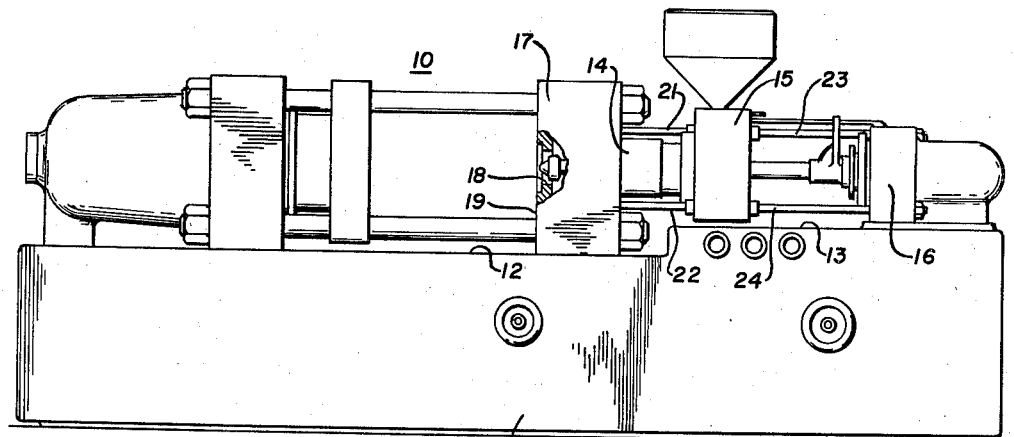
Figure 1 is an elevational view showing generally the basic elements of an injection molding machine.

The injection molding machine shown in Figure 1 and illustrated generally by the reference numeral 10 comprises generally a base frame 11 having a first and second surface indicated by the reference numerals 12 and 13 respectively. The injection molding machine also comprises a heating element and nozzle assembly 14, a material hopper assembly 15 and an injection ram assembly 16. As shown in Figure 1, a die head 17 is mounted upon the first surface 12 of the injection molding machine 10. This stationary die head is provided with a bore 18 which extends from a first side 19 of the die head to a second side 20 of the die head. The material hopper assembly 15 is supported by means of support members 21, 22, 23 and 24 respectively. The heating element and nozzle assembly is attached to the material hopper assembly 15 by bolting or other suitable means.

As can be seen from the assembly of these parts in Figure 1, there are a great many tolerances which, when added up, illustrate why the center line of the nozzle assembly 14 might not lie on the center line of the bore 18. Illustrative of these tolerances is the tolerance in machining the bore 18 in the die head 17. Another tolerance is that which is obtained in locating the second surface 13 of the base frame 11 with respect to the first surface 12 of the base frame 11. Another tolerance is effected when the support members 21 and 22 respectively are located on the die head 17. A still further tolerance occurs in locating the support members 23 and 24 in the injection ram assembly 16. A still further tolerance is effected by the bending of these support members because of the weight of the material hopper 15. Another tolerance occurs because of the location of the means for holding the heating element and nozzle assembly to the material hopper assembly. Another tolerance is that obtained by the cantilever or overhung beam effect of the mounting of the heating element and nozzle assembly. A still further tolerance will be apparent because of the manufacturing tolerances in the actual making of the heating element assembly and that of the nozzle itself. These tolerances all add up to explain why the injection nozzle is seldom, if ever, located exactly on the center line of the bore 18 in the die head 17. As a result, a mold or a portion of a mold such as a sprue bushing, having a central depressed surface to engage the nozzle and an outer peripheral wall to reside within the bore 18, will not correspond to the relative position of the injection nozzle since when the sprue bushing or mold portion was manufactured, the manufacturer assumed that the injection nozzle would be exactly on the center line of the bore 18.

Figure 2:
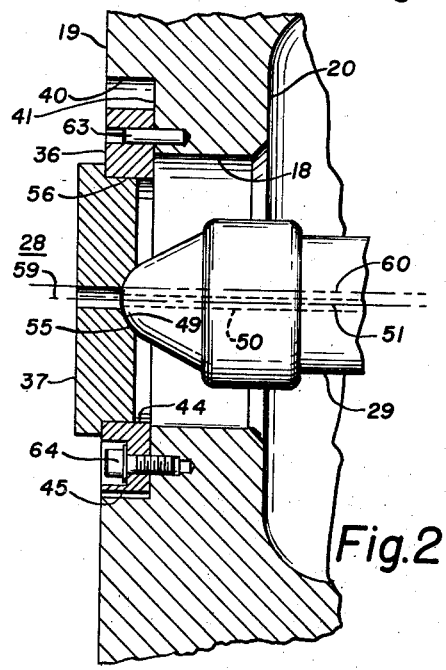
Figure 2 is a fragmentary elevational view showing generally the position of the injection nozzle within the opening in the stationary die head.
Figure 3:
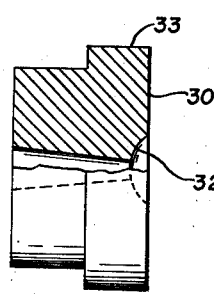
Figure 3 is a view of a sprue bushing is adapted to connect an injection nozzle to a mold cavity.

Figure 2 illustrates a device or aligning means 28 to locate wall means to hold a sprue bushing 30, shown in Figure 3, with reference to an injection nozzle 29. The sprue bushing 30, shown in Figure 3, has a central depressed surface or concave nozzle engaging surface 32 and an outer peripheral wall 33. The device 28 includes generally a die ring 36 and a die ring gauge locater 37. A counterbore 40 extends from the first side 19 of the die head 17 and into the die head a predetermined distance. The bore 18 extends from the counterbore 40 through the die head to the second side 20 of the die head. The bore 18 and the counterbore 40 form an annular shoulder therebetween and illustrated by the reference numeral 41. The annular shoulder may also be referred to as a planar surface or a face surface. The die ring or wall means 36 has an inner peripheral wall 44 and an outer peripheral wall 45. The inner peripheral wall 44 defines an opening through the die ring 36. The outer peripheral wall 45 is made smaller than the counterbore 40 and larger than the bore 18. The die ring 36 resides at least partly in the counterbore 40 and a planar surface thereon rests against the annular shoulder 41. The die ring 36 may also be referred to as a support member. The injection nozzle 29 extends into the bore 18 from the second side 20 of the die head and has a convex end portion 49 with an aperture 50 therein. The aperture 50 provides for the exit of molding material from the nozzle and into a mold with which the nozzle is adapted to communicate. The nozzle 29 has an axis of symmetry indicated by the reference numeral 51. The die ring gauge locater or simply locater 37 has a central depressed surface 55, or nozzle engaging portion at least a portion of which is identical with the central depression surface 32 of the sprue bushing 30.

The die ring gauge locater has an outer peripheral surface 56 or outer surface means which is preferably, but not necessarily, identical with the outer peripheral wall 33 of the sprue bushing 30. The central depressed surface 55 of the die ring gauge locater is adapted to complementarily engage the end portion 49 of the injection nozzle 29 and the outer peripheral surface 56 of the die ring gauge locater is adapted to complementarily engage the inner peripheral wall 44 of the die ring 36. The die ring 36 has a center line 59. The bore 18 in the stationary die head 17 has a center line which is indicated by the reference numeral 60. As illustrated in Figure 2, the axis 51 of the injection nozzle does not lie on the center line 60 of the bore 18 in the stationary die head. The engagement of the die ring gauge locater 37 with the injection nozzle 29 and the die ring 36 causes the center line 59 of the inner peripheral wall 44 of the die ring 36 to lie on the axis 51 of the injection nozzle 29. While the die ring 36 is thus held in this position, suitable means are utilized which attach the die ring 36 to the die head 17 for fixedly maintaining the center line 59 of the die ring on the axis 51 of the injection nozzle 29. These suitable means are illustrated in the embodiment of Figure 2 as pins 63 and screws 64. After the die ring has been fixedly secured to the die head, the die ring gauge locater is removed and is replaced by the sprue bushing which is placed within the fixed die ring and will maintain the correct alignment between the injection nozzle 29 and the central depressed surface 32 of the sprue bushing 30.

Figure 4:
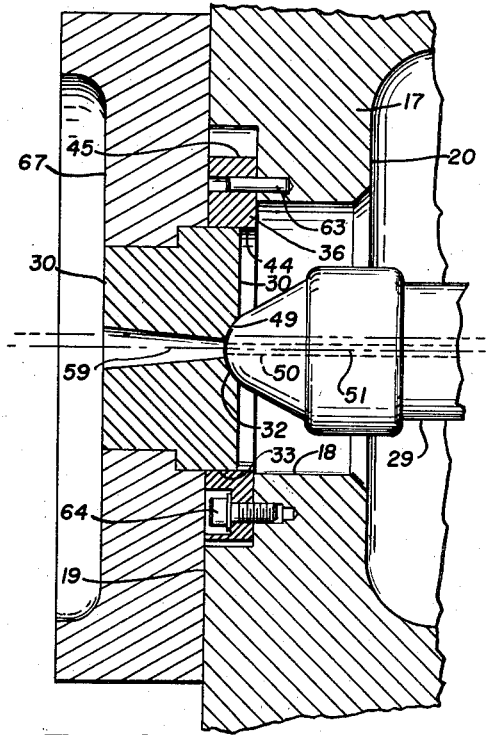
Figure 4 shows the final assembly of a half mold received upon the stationary die head.

As shown in Figure 4, the sprue bushing 30 is suitably fitted into a half mold 67 by suitable means such as driving or by lapping. The half mold is then attached to the die head 17 as shown in Figure 4. The sprue bushing 30 is usually manufactured by a separate manufacturer other than the person manufacturing and assembling the injection molding machine. The central depressed surface 32 of the sprue bushing 30 is therefore placed in the center and usually equidistantly from all points on the outer peripheral wall 33 of the sprue bushing 30. It will thus be seen that if this type of construction is provided on the sprue bushing, then the surface which is to complementarily fit the outer peripheral wall 33 must be equidistant at all points from a surface which is to correspond to the central depressed surface 32 of the sprue bushing. Since the axis of the nozzle in Figure 2 does not lie on the center line 60 of the first bore 18, it is necessary to provide the wall means which are equidistant from the axis of the injection nozzle. As seen in the above illustration, the die ring 36 accomplishes this purpose and hence all of the surfaces will snugly and complementarily engage each other.

It will thus be seen from the foregoing description that a new and novel method of overcoming the adverse effect of the cumulative tolerances which occur in the assembling of an injection molding machine has been provided. This method includes providing a die ring locater which engages a portion of the injection nozzle and also engages a portion of the ring or wall means and therefore definitely locates the center line of the die ring opening on the center line of the nozzle so that the sprue bushing of the mold which is provided with a central surface portion to receive a portion of the injection nozzle exactly fits the nozzle. It will thus be seen that the need for building in an adjustable means within the injection molding machine itself has been obviated. A new, economical and novel method of compensating for the cumulative tolerances which occur in the assembling of an injection molding machine and which contribute to the reason that the injection nozzle in such a machine is not on the true center line of the bore in the machine has been provided.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an injection molding machine having a base mounting a die head with a bore and counterbore therein joined by a first planar surface normal thereto as an annular shoulder therebetween and having an injection nozzle with an end portion and an axis and extending within said bore and mounted on the base independently of said die head whereby said nozzle is possibly misaligned in said bore, said machine adapted to carry a mold half attached to said die head and which has a sprue bushing therein having an outer peripheral wall of a first diameter and a nozzle engaging surface coaxial therewith; the provision of aligning means to align said sprue bushing relative to said injection nozzle, said aligning means comprising a die ring having an axis, an inner peripheral wall on said die ring of said first diameter defining an opening through said die ring, an outer peripheral wall on said die ring smaller than said counterbore and larger than said bore, a second planar surface on said die ring normal to the axis thereof and engaging said first planar surface with the die ring residing at least partially in said counterbore, and means attaching said die ring to said die head for fixedly maintaining the axis of said die ring on the axis of said injection nozzle whereby the placing of said sprue bushing within said fixed die ring will maintain the correct alignment between said injection nozzle and the nozzle engaging surface of said sprue bushing.

2. In an injection molding machine having a die head with a bore and a counterbore therein joined by a planar surface and having an injection nozzle extending within said bore, said machine adapted to carry a mold half attached to said die head and which has a sprue bushing therein having an outer peripheral wall of a first diameter and a nozzle engaging surface; the provision of aligning means to align said sprue bushing relative to said injection nozzle, said aligning means comprising a die ring having an inner peripheral wall of said first diameter defining an opening through said die ring and an outer peripheral wall on said die ring smaller than said counterbore and larger than said bore, said die ring residing at least partially in said counterbore and means attaching said die ring to said die head for fixedly maintaining said die ring in a desired position relative to said nozzle whereby the placing of said sprue bushing within said fixed die ring will maintain the correct alignment between said injection nozzle and said nozzle engaging surface of said sprue bushing.

3. In an injection molding machine, a frame; an injection nozzle mounted on said frame for separable engagement with a mold part; a die head mounted on said frame for holding a mold part in position for engagement by said nozzle; a die ring positionable on said die head in a desired position relative to said nozzle, said die ring including means engageable with a mold part for effecting accurate positioning thereof on said die head relatively to said nozzle; and means for fixedly attaching said die ring to said die head in said desired position.

4. In an injection molding machine, a frame; an injection nozzle mounted on said frame for separable engagement with a mold part; a die head mounted on said frame for holding a mold part in position for engagement by said nozzle and having a counterbore on its mold part receiving side; a die ring positionable in said counterbore on said die head in a desired position relative to said nozzle, said die ring including means engageable with a portion of a mold part for effecting accurate positioning thereof on said die head relatively to said nozzle; and means for fixedly attaching said die ring to said die head in said desired position.

5. The method of locating a mold part positioning surface on the die head of an injection molding machine with respect to an injection nozzle which extends through a bore in the die head, said method comprising the steps of providing a mold part locating die ring having an inner peripheral surface for effecting mold part positioning, placing said die ring against said face of said die head, providing a locater having outer surface means engageable with said die ring and having nozzle engaging surface means engageable with a portion of said nozzle, placing said nozzle engaging surface means of said locater into engagement with said nozzle and said outer surface means thereof into engagement with respective portions of said die ring, thereby locating said inner peripheral surface of said die ring in a predetermined position relative to said nozzle, and securing said die ring to said die head and thereafter removing said locater.

References Cited in the file of this patent
UNITED STATES PATENTS

| | | |
|---|---|---|
| 2,465,482 | Rhodes | Mar. 29, 1949 |
| 2,505,602 | Bertrand | Apr. 28, 1950 |
| 2,627,630 | Farley | Feb. 10, 1953 |